United States Patent Office 3,573,233
Patented Mar. 30, 1971

3,573,233
PROCESS FOR THE PRODUCTION OF
FOAMED MATERIALS
Franz Alfes, Krefeld, Werner Kloker, Krefeld-Uerdingen, Leonhard Goerden, Oedt, Rhineland, and Karl Raichle, Krefeld-Bockum, Germany, assignors to Farbenfabriken Bayer Aktiengesellschaft, Leverkusen, Germany
No Drawing. Filed July 18, 1967, Ser. No. 654,065
Claims priority, application Germany, July 21, 1966, F 49,752
Int. Cl. C08f 47/10; C08v 1/22
U.S. Cl. 260—2.5
12 Claims

ABSTRACT OF THE DISCLOSURE

Improved process of producing foamed materials from a copolymerizable mixture of unsaturated polyesters and a monomeric polymerizable vinyl compound employing as foaming agent a carbonic acid ester anhydride wherein said foaming agent liberates carbon dioxide without the application of external heat by virtue of the presence of certain amine compounds.

---

Foamed materials may be produced by heating synthetic materials with a content of compounds which split off expanding agents by thermal decomposition. As compounds which split off expanding agents there may be used, inter alia, those compounds which contain carbonic acid ester anhydride, especially carboxylic acid-carbonic acid ester anhydride groups. Compounds of this type split off carbon dioxide which acts as expanding agent for the synthetic material, at elevated temperatures lying, as a rule, between about 90° C. and about 150° C. depending on the composition of the compounds.

The special advantage of this process consists in that as decomposition products there are formed, besides carbon dioxide, almost exclusively carboxylic acid esters which, if they do not themselves take part in the structure of the molecule of the synthetic material, are well compatible with most synthetic materials; such carbonic acid esters are frequently incorporated with the synthetic materials as plasticisers.

This process is applicable not only to the foaming of thermoplastic synthetic material, but also to cross-linkable synthetic materials, for example, also to mixtures of unsaturated polyesters with monomeric copolymerizable vinyl compounds, which can be polymerized by the addition of a catalyst and are briefly called polyester resins. In this case the type and amount of the polymerization catalyst must be so chosen that at the temperature at which the carbonic acid ester anhydride splits off carbon dioxide, the copolymerization simultaneously takes place, i.e. that the foaming process and the cross-linking process proceed synchronously. Since, however, both reactions are initiated only after external heat supply and the copolymerization is an exothermic process, it is difficult so to control the process that the right temperature is always adjusted in the reaction mixture at the right time, inorder to ensure the aforesaid synchronization.

The object of the present invention comprises an improved, i.e. an easily controllable, process for the production of foamed materials by foaming copolymerizable mixtures of unsaturated polyesters and monomeric copolymerizable vinyl compounds with a content of polymerization catalysts by decomposition of carbonic acid ester anhydrides contained in the mixtures.

This process comprises adding to the mixtures, in order to reduce the decomposition temperature of the carbonic acid ester anhydride, primary or acyclic or cyclic secondary or, preferably, acyclic or cyclic tertiary amines with alkyl, cycloalkyl, alkenyl or alkaryl radicals, or their quaternary ammonium bases, or primary or secondary N-monoaryl amines, in amounts of about 1% to about 70%, referred to the amount of carbonic acid ester anhydride present, and a catalyst-accelerator system which brings about the cold hardening of the unsaturated polyester resins.

This process is based on the knowledge that certain amines characterized above, typical representatives of which will be mentioned further below, are suitable for reducing the decomposition temperature of carbonic acid ester anhydrides to room temperature. Since, as has been mentioned above, these specific carbonic acid ester anhydride-amine combinations are combined according to the invention with a known cold-hardening adjustment of the polyester-monomer mixtures, this process requires no external heat supply; the difficulties mentioned above, which arises in the known process in which foaming and hardening take place only at elevated temperatures and therefore only after external heat supply, are thus obviated.

It must be emphasized that 3 groups of amines must be distinguished with regard to the present process. Besides the amines characterised above, which reduce the decomposition temperature of the carboxylic acid-carbonic acid ester anhydrides to room temperature and which do not include, in particular, teritary monoarylamines and e.g. also secondary or tertiary di- and triarylamines, tertiary monoarylamines are sometimes required in known manner, i.e. if a diacyl peroxide is chosen as polymerization catalyst, since, as is known, mixtures of unsaturated polyesters with copolymerizable monomers are adjusted to cold-hardening by the addition of a combination of diacyl peroxide catalyst+tertiary monoarylamine accelerator. It is known that a tertiary monoarylamine can be added to the hardenable mixtures as such, but it can also be incorporated with the unsaturated polyester according to the process of German patent specification No. 919,431.

In addition to the amines reducing the decomposition temperature of the carbonic acid ester anhydrides and to the tertiary monoarylamines accelerating the copolymerization, as mentioned above, there are, finally, also those amines which cannot be used in either sense. These are, for example, secondary and tertiary di- and triarylamines.

For the synchronous course of the foaming process and the hardening process it is not only important that the two processes should start at the same temperature and the same time, but also that they should require approximately the same time for their completion; on the other hand, the foaming time is determined by the intensity of the decomposition of the carbonic acid ester anhydride and this, in turn, depends on its chemical structure and on the type and amount of the amine affecting the decomposition, whereas the velocity of the hardening is known to be a function of the reactivity of the unsaturated polyester and the monomeric vinyl compound and their proportion, on the type and amount of the peroxide used and the type and amount of the matching polymerization accelerator and, possibly, on the type and amount of a polymerization inhibitor which may also be added. It is therefore necessary to harmonize these 10 or 12 factors.

This can easily be achieved by preliminary experiments. It is expedient to establish first in a partial experiment the type and amount of the decomposition amine to be added within the limits stated above, to the carbonic acid ester anhydride which has been arbitrarily chosen and dissolved in the unsaturated polyester resin, in order that the decomposition of the carboxylic acid-carbonic acid ester anhydride proceeds within the period of time provided for the production of the foamed material, for example, within 5 to about 30 minutes. In a second experiment there is established the type and amount of polymerization catalyst—diacyl peroxide or hydroperoxide—and the type and amount of matching accelerator—tertiary monoarylamine or heavy metal compound, e.g. cobalt compound—and, possibly, the type and amount of an inhibitor, which are to be added to an arbitrarily chosen mixture of an unsaturated polyester, a monomeric copolymerizable vinyl compound and a carbonic acid ester anhydride for this mixture to harden at room temperature in approximately the same time in which the decomposition of the carbonic acid ester anhydride of the first experiment proceeds to completion. It is then only necessary to combine the two partial experiments to obtain the final mixture, i.e. the amounts of individual additives established in the two partial experiments are added to the chosen polyester-monomer mixture within a short time, while thoroughly mixing. The foaming and hardening then start spontaneously and are completed after the period of time previously adjusted.

Foamed materials of particularly low density are obtained by:

(1) Using an unsaturated polyester resin of low reactivity and high viscosity, e.g. 10,000 centipoises and more, which may also contain thickening agents, such as highly etherified cellulose, (2) Adding known foam stabilisers, such as polysiloxane copolymers, to the polyester resin, and (3) Choosing a cold-hardening system in which the period of time between gelling and solidification is not too short, i.e. in which the gel-like state is maintained for an especially long time.

From the large number of combinations possible according to the invention, a few typical combinations which are especially suitable for the present process are assembled in the following:

30 g. of commercial unsaturated polyester resin of low reactivity (viscosity about 10,000–12,000 centipoises) are thoroughly mixed with 0.39 g. of a polysiloxane-hydroxyalkylene copolymer and 0.67 g. of a 50% solution of the sodium salt of sulphonated castor oil in distilled water. The amounts of carbonic acid ester anhydride, peroxide, inhibitor, accelerator and decomposition amine set out in Table 1 are then added, again with good mixing. The test results can be seen from Table 1:

TABLE 1

| No. | Carbonic acid ester anhydride | Amine for decomposition Type | G. | Peroxide compound Type | G. | Accelerator Type | G. | Inhibitor, g. | Density of foam | Remarks |
|---|---|---|---|---|---|---|---|---|---|---|
| 1(a) | IM | N,N-dimethylbenzylamine. | 0.768 | BP | 2.4 | DMA | 2.0 | 0 | (¹) | Hardening too fast. |
| 1(b) | IM | ----do---- | 0.768 | BP | 1.2 | DMA | 1.0 | 0.08 | (¹) | Hardening too slow. |
| 1(c) | IM | ----do---- | 0.768 | BP | 1.2 | DMA | 1.0 | 0.04 | 0.21 | |
| 2(a) | BÄ | Di-n-butylamine | 0.728 | AP | 2.4 | Co-N. | 0.74 | 0 | 0.40 | Too little amine, hard. Too fast. |
| 2(b) | BÄ | ----do---- | 2.912 | AP | 2.4 | Co-N. | 0.74 | 0.06 | (¹) | |
| 2(c) | BÄ | ----do---- | 2.912 | AP | 2.4 | Co-N. | 0.74 | 0 | 0.22 | Hard. Too slow. |
| 3(a) | MÄ | N,N-dimethylbenzylamine. | 0.768 | BP | 1.2 | DMA | 1.0 | 0 | (¹) | Too little amine, hard. Too fast. |
| 3(b) | MÄ | ----do---- | 2.3 | BP | 1.2 | DMA | 1.0 | 0.02 | (¹) | Hard. Too slow. |
| 3(c) | MÄ | ----do---- | 2.3 | BP | 1.2 | DMA | 1.0 | 0 | 0.23 | |
| 4(a) | IM | Cyclohexylamine | 0.558 | BP | 1.2 | DPT | 0.2 | 0 | (¹) | Hard. Too fast. |
| 4(b) | IM | ----do---- | 0.558 | BP | 1.2 | DPT | 0.2 | 0.08 | (¹) | Hard. Too slow. |
| 4(c) | IM | ----do---- | 0.558 | BP | 1.2 | DPT | 0.2 | 0.04 | 0.23 | |

¹ No foam.

NOTE:
IM = isophthalic acid-bis-(carbonic acid methyl ester anhydride).
BÄ = benzoic acid-carbonic acid ethyl ester anhydride.
MÄ = methacrylic acid-carbonic acid ethyl ester anhydride.
BP = benzoyl peroxide paste (50%).
AP = cyclohexanone peroxide paste (50%).
DMA = dimethyl-aniline.
Co-N. = 20% solution of cobalt naphthenate in styrene.
DPT = dimethyl-p-toluidine.
Inhibitor = toluhydroquinone.

The unsaturated polyesters are prepared in known manner (of e.g. the book by I. Björcksten "Polyesters and their Application," Reinhold Pattishins Corp., New York, 1956) by polycondensation of polyhydric, especially dihydric, alcohols, such as, for example, ethylene glycol, polyethylene glycols, neopentyl glycol, propylene glycols, polypropylene glycols, butane diol-1,3 and -1,4, pentane diol-1,5 hexane diol-1,6, cyclohexane diol-1,4, perhydrobisphenols, bis-(β-hydroxyethoxy phenyl)alkanes, glycerol, trimethylol ethane, -propane and -butane etc., with ethylene-1,2-dicarboxylic acids or their anhydrides, such as fumaric acid or maleic acid anhydride, optionally with the addition of saturated dicarboxylic acids, such as phthalic acid or its anhydride, isophthalic acid, hexachloro-endomethylene-tetrahydrophthalic acid or its anhydride, succinic acid, adipic acid or sebacic acid. For the production of elastic foams it is advantageous to use long-chain aliphatic dicarboxylic acids, such as dimerised fatty acids, or long-chain diols, such as triethylene glycol.

As mentioned above, in general, polyester resins of low reactivity are preferred. Polyesters with low reactivity are those in which the content of gram mole radicals of ethylene dicarboxylic acids in 100 g. polyester is less than 0.2. In polyesters with middle reactivity this content amounts to 0.2 to 0.3 gram moles, and in polyesters with high reactivity this content amounts to more than 0.3 gram moles.

Suitable copolymerizable monomers are, for example, styrene, mono- and dichlorostyrene, divinylbenzene, vinyltoluene; further vinyl esters, such as vinyl acetate and vinyl benzoate; unsaturated carboxylic acids and their derivatives, such as acrylic acid, acrylic ester and acrylonitrile, and also methacrylic acid and its corresponding derivatives; and, finally, allyl esters, such as allyl acrylate, phthalic acid diallyl ester, triallyl cyanurate and triallyl phosphate.

The polyester-monomer mixtures should contain 10–70 percent by weight, preferably 20–50 percent by weight, of copolymerizable ethylenic-unsaturated monomer compounds, referred to the weight of the mixture.

Examples of carbonic acid ester anhydrides which are to be used according to the invention and can be prepared, for example, according to one of the processes described in German patent specifications Nos. 1,133,727 and 1,210,853, are: pyrocarbonic acid diethyl ester, acetic acid-carbonic acid ethyl ester anhydride, propionic acid-carbonic acid ethyl ester anhydride, sebacic acid-bis-(carbonic acid methyl ester anhydride), adipic acid-bis-(carbonic acid methyl ester anhydride), crotonic acid-carbonic acid methyl ester anhydride, sorbic acid-carbonic acid ethyl ester anhydride and 1,6-hexane-diol-poly-carbonic acid ester-isophthalic acid anhydride).

Carbonic acid ester anhydrides which are as stable as possible at room temperature, are particularly suitable, such as benzoic acid-carbonic acid methyl ester anhydride, benzoic acid-carbonic acid ethyl ester anhydride, diethylene glycol-bis-(carbonic acid-benzoic acid anhydride), isophthalic acid-bis-(carbonic acid methyl ester anhydride), isophthalic acid-bis-(carbonic acid ethyl ester anhydride) and terephthalic acid-monomethyl ester-carbonic acid ethyl ester anhydride. If desired, there are also used mixtures of two or more carboxylic acid-carbonic acid ester anhydrides, for example, a mixture of 70 percent by weight isophthalic acid-bis-(carbonic acid methyl ester anhydride) and 30 percent by weight terephthalic acid-bis-(carbonic acid methyl ester anhydride).

If those carbonic acid ester anhydrides are used, which contain ethylenic-unsaturated copolymerizable radicals, then the corresponding esters formed as splitting products are incorporated with the foamed materials. Examples are: acrylic acid-carbonic acid ethyl ester anhydride, methacrylic acid-carbonic acid methyl ester anhydride and isophthalic acid-bis-(carbonic acid allyl ester anhydride).

The foamable and hardenable masses should contain 1 to 50 percent by weight, preferably 5 to 20 percent by weight, of the carbonic acid ester anhydrides, referred to the total weight of the mixture.

Suitable "decomposition amines" are, for example, ethylamine, n-butylamine, dodecylamine, stearylamine, ethylene-diamine, tetramethylene-diamine, ethanolamine, cyclohexylamine, allylamine, β-phenylethylamine, aniline, p-phenylene-diamine, 2-chloroaniline, 3-chloro-2-aminotoluene, 2-nitroaniline, di-n-butylamine, N-methylstearylamine, diethylene-triamine, diethanolamine, piperidine, piperazine, diallylamine, dicyclohexylamine, methylcyclohexylamine, N-methyl-N-β-phenylethylamine, N-methylaniline, triethylamine, tri-n-butylamine, N,N-dimethylethanolamine, triethanolamine, N,N-diethyl-5-aminopentanone-(2), pyridine, pyrazine, collidine, quinoline, tetraethyl ammonium hydroxide and benzyl-triethyl ammonium hydroxide. Especially suitable are dimethylbenzylamine, dimethylcyclohexylamine, dimethyl-phenylethylamine, tetramethyl-ethylene-diamine, endoethylene-piperazine, 4-dimethylamino-pyridine, N-methyl-N'-dimethylaminoethyl-piperazine, N-alkylmorpholines, N-alkylpiperidines and N-alkylpyrrolidines.

Suitable hardening catalyst systems are, in principle, all catalyst-accelerator combinations which are customarily used for the polymerisation of mixtures of unsaturated polyesters and unsaturated compounds copolymerizable therewith at room temperature, for example, an acyl peroxide, such as benzoyl peroxide, acetyl benzoyl peroxide, phthalic peroxide, dibutyryl peroxide, succinyl peroxide, lauroyl peroxide, coconut oil acid peroxide and oleic peroxide, as catalyst and an amine, preferably a tertiary aromatic amine, such as dimethyl- and diethyl aniline, dimethyl- and diethyl-p-toluidine etc. as accelerator, or a hydro-peroxide, such as methyl ethyl ketone hydroperoxide, diethyl ketone hydroperoxide, cyclohexanone hydroperoxide etc., as catalyst and a metal soap, such as lead, manganese and particularly cobalt palmitate, stearate, naphthenate etc., as polymerization accelerator. In the latter case, the metal compound simultaneously acts as decomposition catalyst for the carbonic acid ester anhydride.

As inhibitor which may be added there may be mentioned, for example, quinone, hydroquinone, toluhydroquinone, 2,5-di-tert.-butylquinone and 2,6-di-tert.-butyl-p-cresol in amounts of 0.005 to 1.0 percent by weight, preferably 0.01 to 0.1 percent by weight.

The density of the foamed materials can be varied within wide limits by increasing or reducing the amount of carbonic acid ester anhydride and/or of decomposition amine, or by shortening or lengthening the gelling time of the foamable masses.

The foam structure can be improved, if desired, by the addition of foam stabilisers, such as polysiloxane copolymers and/or of wetting agents, such as sulphonated castor oil. The quantity of the aforesaid auxiliaries to be used will generally amount to between 0.1 and 5 percent by weight, referred to the total weight of the mass.

As has been mentioned above, the foam structure can moreover be influenced by the addition of thickening agents. Besides the cellulose ethers already mentioned, polyisocyanates and highly disperse silicium dioxide are suitable for this purpose, for example. Unsaturated polyester resins which have previously been thickened with magnesium oxide can also be used with advantage.

It is possible to add inorganic of organic fillers, e.g. fibres, to the foamable polyester moulding masses. Granulated fillers with a bulk weight of less than 1, e.g. expanded clay, slag or pumice, are preferably used and these may amount to a multiple referred to the parts by volume of the polyester moulding mass. In this way there are obtained light, solid mouldings of good dimensional stability and good thermal stability with a proportion of polyester in the range of 5–80 percent by weight, which are suitable as structural plates, prefabricated structure elements, such as partitions, parapet plates, wall covers for sound and heat proofing and for insulations.

It is sometimes advisable to add either flame inhibiting products or to use self-extinguishing types of polyesters.

If desired, the structure and solidity of the foamed material can be improved by an addition of polyisocyanates in amounts of, for example, 5–25 percent by weight, referred to the foamable and hardenable mass.

The parts given in the following examples are parts by weight.

EXAMPLE 1

An unsaturated polyester with the acid number 30, prepared by condensation of 11,350 parts maleic acid anhydride, 31,840 parts phthalic acid anhydride, 14,900 parts 1,3-butanediol, 17,540 parts diglycol and 15,390 parts castor oil with the addition of 13.2 parts hydroquinone, is dissolved in sufficient parts of styrene to form a solution containing 80% of solid product and having a viscosity of 11,970 centipoises. 30 g. samples of the clear resin solution are admixed in a beaker, by means of a rapid stirrer, with 3 g. isophthalic acid-bis-(carbonic acid methyl ester anhydride), 0.39 g. organo-siloxane-hydroxyalkylene copolymer, 0.67 g. of a 50% solution of the sodium salt of sulphonated castor oil in distilled water, 0.04 g. of toluhydroquinone and 1.2 g. of a benzoyl peroxide paste. The mass is then thoroughly mixed with 1 g. of a 20% solution of dimethylaniline in styrene and one of the amines set out in the following Table I in the amount there stated. When the foaming reaction is completed, there has been formed a foam which has the density indicated in Table I and is insoluble in the usual organic solvents.

TABLE I

| Amine, type: | Amount, g. | Density of resultant foamed material, g./cc. |
|---|---|---|
| n-Butylamine | 0.404 | 0.44 |
| Cyclohexylamine | 0.558 | 0.21 |
| Ethanolamine | 0.343 | 0.28 |
| Ethylene-diamine | 0.169 | 0.29 |
| N,N-diallylamine | 0.547 | 0.37 |
| β-Phenyl-ethyl-amine | 0.681 | 0.35 |
| Piperidine | 0.478 | 0.60 |
| Tri-n-butylamine | 1.042 | 0.25 |
| N,N-dimethyl-cyclohexylamine | 0.716 | 0.14 |
| Tetraethyl ammonium hydroxide | 0.825 | 0.14 |
| Triethanolamine | 0.838 | 0.09 |
| N,N-dimethyl-ethanolamine | 0.50 | 0.105 |
| N,N-diethyl-5-amino-pentanone-2 | 0.882 | 0.08 |
| Endoethylene-piperazine | 0.325 | 0.27 |
| N-methyl-N'-dimethyl-amino-ethylpiperazine | 0.316 | 0.21 |
| N,N-dimethyl-benzylamine | 0.768 | 0.14 |
| Pyridine | 0.445 | 0.17 |
| Triphenylamine | 1.35 | (1) |

1 No foamed material.

EXAMPLE 2

30 g. samples of the polyester-styrene solution used in Example 1 are admixed in a beaker, by means of a rapid stirrer, with one of the carbonic acid ester anhydrides set out in Table II in the amounts there stated, 0.39 g. of organo-siloxane-hydroxylalkylene copolymer, 0.67 g. of a 50% solution of the sodium salt of sulphonated castor oil in distilled water, 0.04 g. toluhydroquinone and 1.2 g. of a benzoyl peroxide paste. The mass is then thoroughly mixed with 1 g. of a 20% solution of dimethyl-aniline in styrene and 0.84 g. triethanolamine, and foamed. The densities of the resultant foamed materials are assembled in Table II:

TABLE II

| Carbonic acid ester anhydride, Type | Amount, g. | Density of resultant foamed material, g./cc. |
|---|---|---|
| Isophthalic acid-bis-(cargonic acid ethyl ester) anhydride | 5 | 0.22 |
| Isophthalic acid-bis-(carbonic acid allyl ester) anhydride | 5 | 0.17 |
| Methacrylic acid carbonic acid ethyl ester anhydride | 5 | 0.22 |
| Benzoic acid-carbonic acid methyl ester anhydride | 5 | 0.27 |
| Adipic acid-bis-(carbonic acid methyl ester) anhydride | 5 | 19 |
| Mixture of 70% isophthalic acid bis-(carbonic acid methyl ester) anhydride and 30% terephthalic acid-bis-(carbonic acid methyl ester) anhydride | 3 | 0.1 |

EXAMPLE 3

An unsaturated polyester with the acid number 30, prepared by condensation of 669 parts maleic acid anhydride, 2,245 parts phthalic acid anhydride and 2,040 parts 1,3-butanediol with the addition of 0.7 part hydroquinone, is dissolved in sufficient parts of styrene to form a solution which contains 75% of solid product and has a viscosity of 5,360 centipoises. 30 g. samples of the clear resin solution are admixed in a cardboard beaker, by means of a rapid stirrer, with 3 g. isophthalic acid-bis(carbonic acid methyl ester) anhydride, 0.39 g. of organosiloxane-hydroxy alkylene copolymer, 0.67 g. of a 50% solution of the sodium salt of sulphonated castor oil in distilled water and 1.3 g. of a cyclohexanone peroxide paste. The mass is then thoroughly mixed with 0.37 g. of a solution of cobalt naphthenate in styrene containing 2.8% cobalt, and one of the amines set out in the following Table III in the amounts there stated. A foam is immediately formed which gels after some time. The densities of the resultant foamed materials are assembled in Table III:

TABLE III

| Amine, type | Amount, g. | Density of resultant foamed material, g./cc. |
|---|---|---|
| n-Butylamine | 0.404 | 0.34 |
| Cyclohexylamine | 0.558 | 0.24 |
| Ethanolamine | 0.343 | 0.38 |
| Ethylenediamine | 0.169 | 0.54 |
| Dodecylamine | 1.04 | 0.28 |
| Stearylamine | 1.52 | 0.38 |
| Allylamine | 0.322 | 0.43 |
| Tetramethylene-diamine | 0.248 | 0.30 |
| Aniline | 0.525 | 0.29 |
| 2-chloroaniline | 0.717 | 0.33 |
| 2-nitroaniline | 0.778 | 0.34 |
| 3-chloro-2-aminotoluene | 0.795 | 0.27 |
| β-Phenyl-ethylamine | 0.681 | 0.30 |
| p-Phenylene-diamine | 0.305 | 0.44 |
| Diethylene-triamine | 0.168 | 0.24 |
| Di-n-butylamine | 0.728 | 0.24 |
| N-methyl-stearylamine | 1.60 | 0.37 |
| Diallylamine | 0.547 | 0.41 |
| Diethanolamine | 0.592 | 0.20 |
| N-methylaniline | 0.603 | 0.37 |
| Piperidine | 0.478 | 0.40 |
| Triethylamine | 0.57 | 0.12 |
| Tri-n-butylamine | 1.042 | 0.24 |
| Tetraethyl ammonium hydroxide | 0.825 | 0.21 |
| Dimethyl-cyclohexylamine | 0.716 | 0.14 |
| Triethanolamine | 0.838 | 0.13 |
| N,N-dimethylethanolamine | 0.50 | 0.15 |
| N,N,N',N'-tetramethylethylene-diamine | 0.32 | 0.16 |
| N,N-dimethyl-5-amino-pentanone-2 | 0.882 | 0.18 |
| Endoethylene-piperazine | 0.325 | 0.30 |
| N,N-dimethylbenzylamine | 0.768 | 0.16 |
| N-methyl-N'-dimethyl-aminoethyl-piperazine | 0.316 | 0.18 |
| Pyridine | 0.445 | 0.25 |
| Diephenylamine | 0.95 | (1) |
| p-Aminophenol | 0.615 | (1) |
| N,N-dimethyl-p-toluidine | 0.76 | (1) |

1 No foamed material.

EXAMPLE 4

870 parts fumaric acid, 2,918 parts hexachloroendo-methylene-tetrahydrophthalic acid, 810 parts glycol and 198 parts diglycol are condensed, after the addition of 0.84 part hydroquinone, under the usual conditions to form an unsaturated polyester with the acid number 38. This is dissolved in known manner in sufficient parts of styrene to form an 80% solution. To 30 parts of this solution are added 3 parts isophthalic acid-bis-(carbonic acid methyl ester) anhydride, 0.12 part toluhydroquinone as a 10% by weight solution in the polyester mixture, 0.39 part of organo-siloxane-hydroxyalkylene copolymer, 0.67 part of a 50% solution of the sodium salt of sulphonated castor oil in distilled water and 1.2 parts of a benzoyl peroxide paste. The components are thoroughly mixed, and 0.84 part triethanolamine and 1 g. of a 20% solution of dimethylaniline in styrene are subsequently added, and the mixture is stirred. The resultant foam has a density of 0.11 g./cc.

EXAMPLE 5

2,422 parts maleic acid anhydride, 193 parts phthalic acid anhydride and 2,078 parts 1,2-propane-diol are condensed, after the addition of 0.635 part hydroquinone, in known manner until the unsaturated polyester has attained an acid number of 7. The resin is ground and dissolved at room temperature in sufficient parts of styrene to form a solution containing 80 percent by weight of polyester. To 30 parts of the polyester-styrene solution there are first added 0.12 part toluhydroquinone, 0.39 part of organo-siloxane-hydroxy-alkylene copolymer, 0.67 part of a 50% solution of the sodium salt of sulphonated castor oil in distilled water and 1.2 parts of a benzoyl peroxide paste, and the components are thoroughly mixed by means of a rapid stirrer. 3 parts isophthalic acid-bis-(carbonic acid methyl ester) anhydride, 0.84 part triethanolamine and 1 part of a 20% solution of dimethylaniline in styrene are then added with stirring. The resultant foamed material has a density of 0.17 g./cc.

EXAMPLE 6

120 parts of an unsaturated polyester resin prepared according to Example 1, 12 parts isophthalic acid-bis-(carbonic acid methyl ester) anhydride, 0.04 part toluhydroquinone, 1.56 parts of organosiloxane-hydroxyalkylene copolymer 2.68 parts of a 50% solution of the sodium salt of sulphonated castor oil in distilled water, 4.8 parts of a benzoyl peroxide paste, 1.8 parts pyridine and 4 parts of a 20% solution of dimethyl-aniline in styrene are intensely mixed and poured into a cubic steel mould. The mould is then filled up with 236 parts of expanded clay with a particle size of 3–15 mm. and covered with a wire mesh which is loaded with weight. The expanded clay/polyester foam cube thus produced has a density of 0.51 g./cc.

EXAMPLE 7

13 g. isophthalic acid-bis-(carbonic acid methyl ester) anhydride are dissolved in 119 g. of the polyester resin prepared according to Example 1. The following components are added thereto in the order as stated.

12 g. glass fibre (6 mm.)
0.04 g. toluhydroquinone
1.56 g. polysiloxane-hydroxyalkylene copolymer
2.56 g. 50% solution of the sodium salt of sulphonated castor oil in distilled water
4.8 g. benzoyl peroxide paste
1.8 g. pyridine and
4.0 g. dimethylaniline solution (20% in styrene)

and the whole is thoroughly mixed. The density of the resultant foamed material amounts to 0.31 g./cc.

EXAMPLE 8

30 parts of a commercial unsaturated polyester resin of low reactivity with a viscosity of 10,000 centipoises at 20° C. are intensely mixed in a cardboard beaker in the order as stated with 3 parts pyrocarbonic acid diethyl ester, 0.39 part of polysiloxane copolymer, 0.67 part of a 50% solution of the sodium salt of sulphonated castor oil in distilled water, 0.25 part dimethyl-benzylamine, 0.37 part of a 20% solution of cobalt naphthenate in styrene and 1.2 parts of a 50% cyclohexanone paste. A fine-pore foamed material is formed, which reaches its maximum height after 20 minutes, then gels and hardens; its density amounts to 0.15 g./cc.

The advance constituted by the process is illustrated by the following comparative tests using known foaming agents:

Comparative tests

In the recipe described in Example 2 the carboxylic acid-carbonic acid ester anhydrides are replaced with the known foaming agents set out in the following table in the amounts there stated:

TABLE IV

| Foaming agent | Amount g. | Remarks |
|---|---|---|
| Benzene-sulphohydrazide | 3 | No foam. |
| Azoisobutyric acid dinitrile | 3 | Do. |
| Azodicarbonamide | 3 | Do. |
| Diphenylsulphone-3,3′-disulphohydrazide | 3 | Do. |

What is claimed is:
1. A process for the production of foamed materials from a copolymerizable mixture of unsaturated polyesters which are polycondensation products of ethylene dicarboxylic acid and polyhydric alcohols, and monomeric polymerizable vinyl compounds which comprises adding to the copolymerizable mixture
   (a) an organic peroxide as polymerization catalyst,
   (b) an accelerator adapted to the peroxide catalyst to reduce the temperature of the reactivity of the catalyst to room temperature,
   (c) a carbonic acid ester anhydride decomposing with splitting off of carbon dioxide and
   (d) a primary or an acyclic ar cyclic secondary or an acyclic or cyclic tertiary amine with alkyl, cycloalkyl, alkenyl or alkaryl radicals, or its quaternary ammonium base or a primary or secondary N-monoarylamine, in amounts of about 0.1 to about 70 percent by weight, referred to the amount of carbonic acid ester anhydride present, said amine compound reducing the decomposition temperature of the carbonic acid ester anhydride of (c) to room temperature and allowing said mixture to foam in the absence of externally applied heating.

2. Process according to claim 1, wherein the unsaturated polyester has a low reactivity.

3. Process according to claim 1, wherein the polymerisation catalysts (a) is an acyl peroxide and the accelerator (b) is an amine.

4. Process according to claim 1, wherein the polymerisation catalyst (a) is a hydroperoxide and the accelerator (b) is a metal soap.

5. Process according to claim 1, wherein the carbonic acid ester anhydride is a carboxylic acid-carbonic acid ester anhydride.

6. Process according to claim 1, wherein the content of the carbonic acid ester anhydride amounts to about 1 to about 50 percent by weight, referred to the total amount of the mixture.

7. Process according to claim 1, wherein the decomposing amine is selected from the group consisting of dimethyl-benzylamine, dimethyl-cyclohexylamine, dimethyl-phenyl-ethylamine, tetramethyl-ethylene-diamine, endoethylene-piperazine, 4-dimethyl-amino-pyridine, N-methyl-N′-dimethyl-aminoethyl-piperazine, N - alkylmorpholines, N-alkylpiperidines and N-alkylpyrrolidines.

8. Process according to claim 1, wherein the mixture has an additional content of an inhibitor.

9. Process according to claim 1, wherein the mixture has an additional content of a foam stabilizer.

10. Process according to claim 1, wherein the mixture has an additional content of a wetting agent.

11. Process according to claim 1, wherein the mixture has an additional content of a thickening agent.

12. Process according to claim 1, wherein the mixture has an additional content of fillers.

References Cited

UNITED STATES PATENTS

| 3,222,302 | 12/1965 | Boilert et al. | 260—2.5R |
| 3,232,893 | 2/1966 | Salgado et al. | 260—2.5N |
| 3,260,688 | 7/1966 | Watanabe et al. | 260—2.5N |

FOREIGN PATENTS

| 652,770 | 5/1951 | Great Britain | 260—2.5N |

MURRAY TILLMAN, Primary Examiner

M. FOELAK, Assistant Examiner

U.S. Cl. X.R.

260—16, 22, 40, 75, 827, 861, 863, 864, 869